United States Patent
Gavit et al.

(10) Patent No.: US 11,845,497 B2
(45) Date of Patent: Dec. 19, 2023

(54) METHOD AND SYSTEM FOR FLAT TOW STABILIZATION OF A VEHICLE USING ELECTRICAL POWER STEERING

(71) Applicants: Terry Gavit, Saginaw, MI (US); Jonathan Kuhn, Macomb, MI (US); James K Beeler, Farmington Hills, MI (US); Dineshkumar Rajendran, Rochester Hills, MI (US); Joshua H Green, Royal Oak, MI (US); Adam Mucciacco, Windsor (CA); Logan Schoenfield, Swartz Creek, MI (US)

(72) Inventors: Terry Gavit, Saginaw, MI (US); Jonathan Kuhn, Macomb, MI (US); James K Beeler, Farmington Hills, MI (US); Dineshkumar Rajendran, Rochester Hills, MI (US); Joshua H Green, Royal Oak, MI (US); Adam Mucciacco, Windsor (CA); Logan Schoenfield, Swartz Creek, MI (US)

(73) Assignee: FCA US LLC, Auburn Hills, MI (US)

( * ) Notice: Subject to any disclaimer, the term of this patent is extended or adjusted under 35 U.S.C. 154(b) by 297 days.

(21) Appl. No.: 17/092,426

(22) Filed: Nov. 9, 2020

(65) Prior Publication Data
US 2022/0144333 A1   May 12, 2022

(51) Int. Cl.
*B62D 5/04*   (2006.01)
*B62D 6/00*   (2006.01)
*B60K 23/08*   (2006.01)

(52) U.S. Cl.
CPC ............. *B62D 5/0457* (2013.01); *B62D 6/00* (2013.01); *B60K 23/0808* (2013.01)

(58) Field of Classification Search
CPC ........ B62D 5/0457; B62D 6/00; B62D 12/02; B60K 23/0808; B60K 17/3467; B60Y 2300/28
USPC .......................................................... 701/41
See application file for complete search history.

(56) References Cited

U.S. PATENT DOCUMENTS

| | | | |
|---|---|---|---|
| 8,502,410 B2 | 8/2013 | Heller et al. | |
| 2003/0160428 A1* | 8/2003 | Lindell | B60D 1/485 |
| | | | 180/410 |
| 2005/0178606 A1* | 8/2005 | Husain | B62D 5/003 |
| | | | 180/408 |
| 2015/0251693 A1* | 9/2015 | Lavoie | G06F 3/017 |
| | | | 701/41 |
| 2018/0099660 A1* | 4/2018 | Weigert | B60W 10/18 |
| 2018/0126846 A1 | 5/2018 | Kincaid et al. | |
| 2018/0312195 A1* | 11/2018 | Tae | B60W 10/20 |
| 2021/0347216 A1* | 11/2021 | Robertson | B60D 1/145 |

* cited by examiner

*Primary Examiner* — Scott A Reinbold
(74) *Attorney, Agent, or Firm* — Jeremy J. Klobucar

(57) ABSTRACT

A flat towed vehicle includes a battery and wheels and a supplemental fuse. A transfer case generates a transfer case status signal an electric power steering system coupled to the wheels and the battery through the supplemental fuse. The electrical power steering system has a tow mode and a driven mode. The electric power steering system enters the tow mode when the supplement fuse communicates battery power to the electrical power steering system and the transfer case status signal corresponding to a neutral position.

19 Claims, 3 Drawing Sheets

METHOD AND SYSTEM FOR FLAT TOW STABILIZATION OF A VEHICLE USING ELECTRICAL POWER STEERING

FIELD

The present disclosure relates to towing a towed vehicle with a tow vehicle and, more particularly, to a method and system for stabilizing a towed vehicle during towing using the electric power steering system.

BACKGROUND

This section provides background information related to the present disclosure which is not necessarily prior art.

Flat towing of a vehicle is when a towing vehicle tows a towed vehicle. The towed vehicle is towed with all four wheels contacting the road. Flat towing is popular with off road vehicles and with on-road vehicles. People who own recreational vehicles often tow another vehicle for short term trips. Recreational vehicles are typically parked at a campsite and the towed vehicle is used for local transportation once the destination is reached. Flat towing prevents the owner of the vehicle from having to transport the extra vehicle on a trailer.

Many vehicles have kits that are purchased to allow the vehicle to be towed flat. Safety is an important consideration. Typically, tow bars are connected between the vehicles. In older vehicles, hydraulic steering provides damping and stability for the towed vehicle as it is pulled. However, in newer vehicles, the steering systems are operated electrically and therefore do not have the hydraulic damping.

SUMMARY

This section provides a general summary of the disclosures, and is not a comprehensive disclosure of its full scope or all of its features.

The present disclosure provides a system and method for allowing the electrical power steering system to add stability to a flat towed vehicle in an easy to use manner.

In one aspect of the disclosure, a flat towed vehicle includes a battery and wheels and a supplemental fuse. A transfer case generates a transfer case status signal an electric power steering system coupled to the wheels and the battery through the supplemental fuse. The electrical power steering system has a tow mode and a driven mode. The electric power steering system enters the tow mode when the supplemental fuse communicates battery power to the electrical power steering system and the transfer case status signal corresponding to a neutral position.

In another aspect of the disclosure, a method includes communicating power to an electrical power steering system though a supplemental fuse, communicating a neutral position signal to an electrical power steering system, and enabling a tow mode in the electrical power steering controller in response to the neutral position signal and communicating power through the supplemental fuse.

Further areas of applicability of the teachings of the present disclosure will become apparent from the detailed description, claims and the drawings provided hereinafter, wherein like reference numerals refer to like features throughout the several views of the drawings.

DETAILED DESCRIPTION

It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

Examples will now be described more fully with reference to the accompanying drawings. Although the following description includes several examples of a pickup vehicle application, it is understood that the features herein apply to any appropriate vehicle. The examples disclosed below are not intended to be exhaustive or to limit the disclosure to the precise forms disclosed in the following detailed description. Rather, the examples are chosen and described so that others skilled in the art may utilize their teachings.

Figure 1:
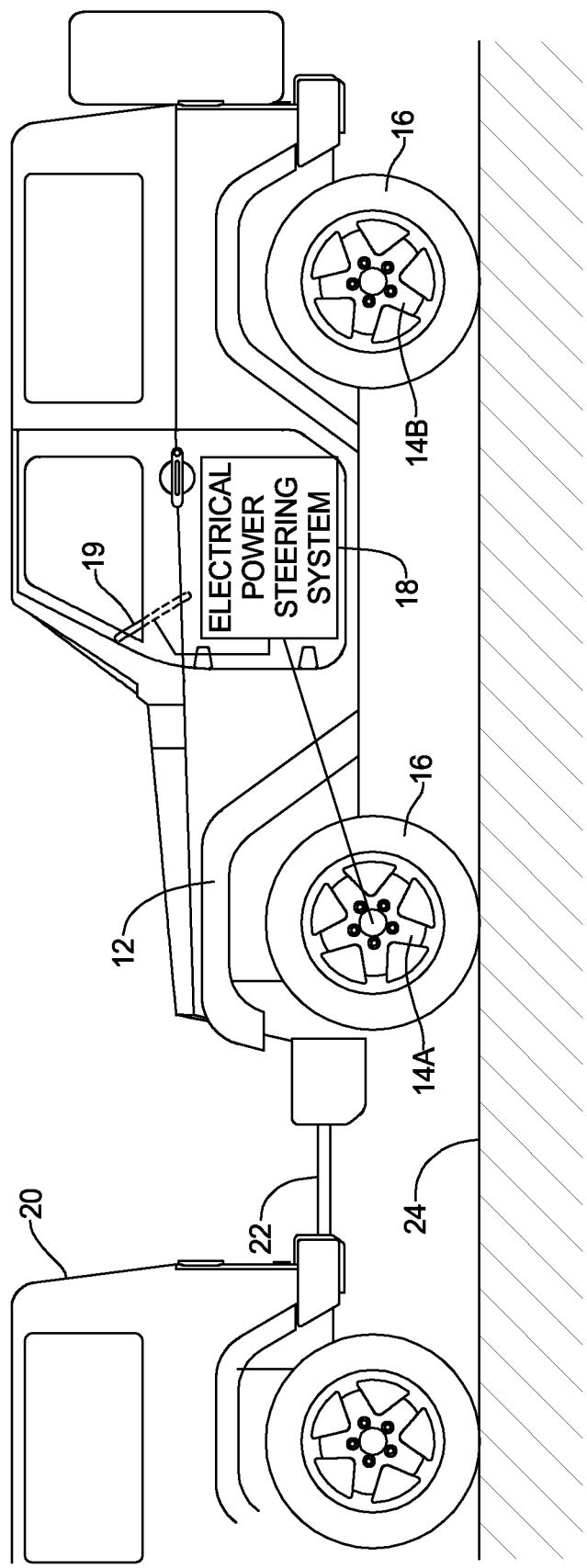
FIG. 1 is a side view of a towed vehicle behind a towing vehicle according to the present disclosure.

Referring now to FIG. 1, a towed vehicle 10 is illustrated. The towed vehicle 10 is illustrated as a light truck. Vehicle 10 includes a vehicle body 12, front wheels 14A, rear wheels 14B, and tires 16. The wheels 14A and 14B are coupled to the body 12 through a suspension (not shown), The front wheels 14A are also coupled to an electric power steering system 18 for steering the towed vehicle 10. A hand wheel 19 is used by the vehicle operator to initiate movement of the front wheels 14A.

A tow vehicle 20 is used for towing the off-road vehicle 10 using a tow apparatus 22 such as a tow bar or one or more tow straps. In this example, the vehicle 10 is towed with all four wheels contacting a road surface 24.

Figure 2:
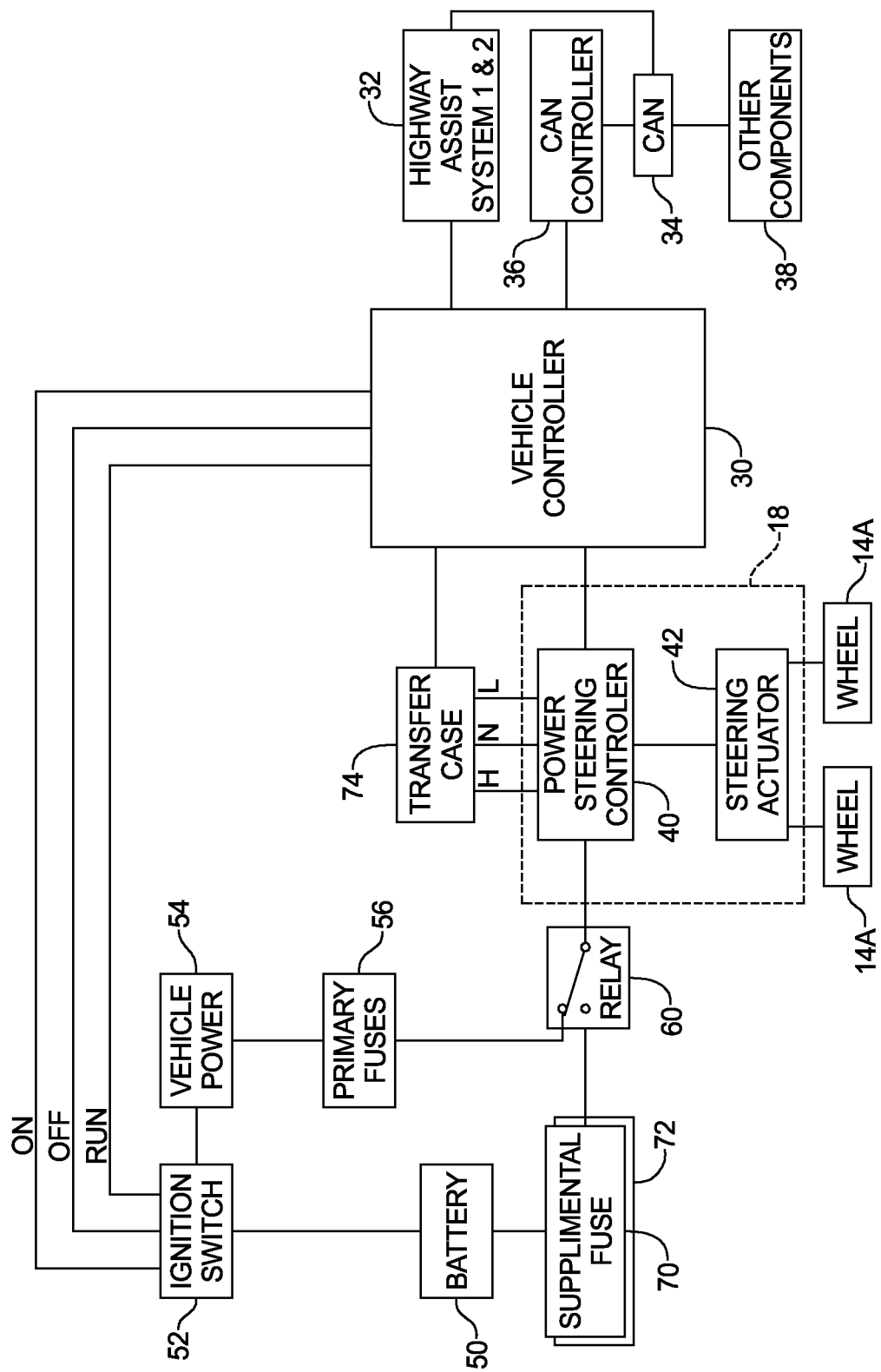
FIG. 2 is a high level block diagrammatic view of the system for operating the power steering controller in a mute mode.

Referring now to FIG. 2, a block diagrammatic view of the electrical component of the vehicle 10 are set forth. In this example, the power steering system 18 has a power steering controller 40 that is coupled to a vehicle controller 30 and is used to control a steering actuator 62 which are coupled to the front wheels 14A of the vehicle.

The vehicle controller 30 is one microprocessor-based controller or, in other examples, a plurality of controllers coupled together that are programmed to perform various functions of the vehicle. The vehicle controller 30 is coupled to one or more safety systems such as a highway assist system 32 that is used for controlling various safety systems and functions of the vehicle. As in many critical safety systems two redundant systems 1 and 2 are provided in this example (but are illustrated in one box). By way of example, the highway assist system 32 is used for lane centering and adaptive cruise control functions. Of course, other functions are controlled by the highway assist 32. The highway assist system 32 generates a safety signal that is communicated through a controller area network 34 which is under the control of the controller area network controller 36. The controller area network controller 36 controls the operation of the controller area network 34 and communication with various components within the vehicle including the components 38 illustrated. The controller area network 34 also communicates with the power steering controller 18.

The towed vehicle 10 includes a battery 50 that is electrically coupled to an ignition switch 52. The ignition switch 52 is a mechanical or electrical switch that generates an on-signal, an off signal or a run signal that is communicated to the vehicle controller 30. The ignition switch 52, when in the on position, allows the vehicle power system 54 to distribute power to various components within the vehicle, which are not shown. The vehicle power system 54 has a plurality of primary fuses 56 associated therewith. The primary fuses 56 prevent excess current from reaching the various components of the vehicle.

The power steering controller 40 receives power from one of the primary fuses 56 through a relay 60. The relay 60 has two positions, one corresponding to the normal or driven position and one corresponding to the towed position. In the driven position, the vehicle power system 54 couples electric power to the power steering controller through one of the primary fuses 56 and the relay 60. The power steering controller 40 is thus able to control the steering actuator and the position of the wheels. Because the vehicle power 54 is providing the power to the power steering controller 40, the power steering controller 40 is operated in a driven mode.

To operate the vehicle in a towed mode, a supplemental fuse 70 is coupled into a fuse holder 72, The supplemental fuse 70 is used to couple the battery 50 to the relay 60 which changes the position of the relay 60 so that the relay 60 provides power to the power steering controller 40. By recognizing the insertion of the supplemental fuse 70 into the vehicle system, the power steering controller 40 is operated in a towed mode. As described in more detail below, the towed mode prevents messages from being communicated from the power steering controller 40 to the controller area network 34. The towed mode also enables the power steering controller 40 to act in a "mute" mode of operation. The damped or mute mode of the power steering controller 40 allows power to be provided from the battery 50 through the supplemental fuse 70, so that a predetermined amount of damping of the towed vehicle is provided with the electrical power steering system 18. The towed mode and the damping provided is determined experimentally, for example, each vehicle has different damping characteristics due to different mechanical and different structural aspects of the system.

The power steering controller 40 is electrically coupled to a transfer case 74. The transfer case 74 communicates mechanical power from the transmission to the front and rear axles of the vehicle. The transfer case 74 generates a transfer case status signal corresponding to the position of a selector of the transfer case 74. The selector, by way of example, is electronic or mechanical. The transfer case status signal corresponds to a high signal corresponding to the transfer case 74 in a high gearing position, a neutral signal corresponding to the transfer case 74 in a neutral or disengaged position and a low signal corresponding to the transfer case 74 in a low gearing position. In one example, a sensor associated with the transfer case generates the transfer case status signal. As is illustrated, the transfer case status signal is coupled to the power steering controller 40. In other examples, the signals from the transfer case are communicated to the vehicle controller 30 and ultimately to the power steering controller 40. The transfer case 74 is a common component in all wheel drive systems and are used for high and low gearing operation. In neutral, the transfer case 74 is used for towing and triggering in the towed mode.

Figure 3:
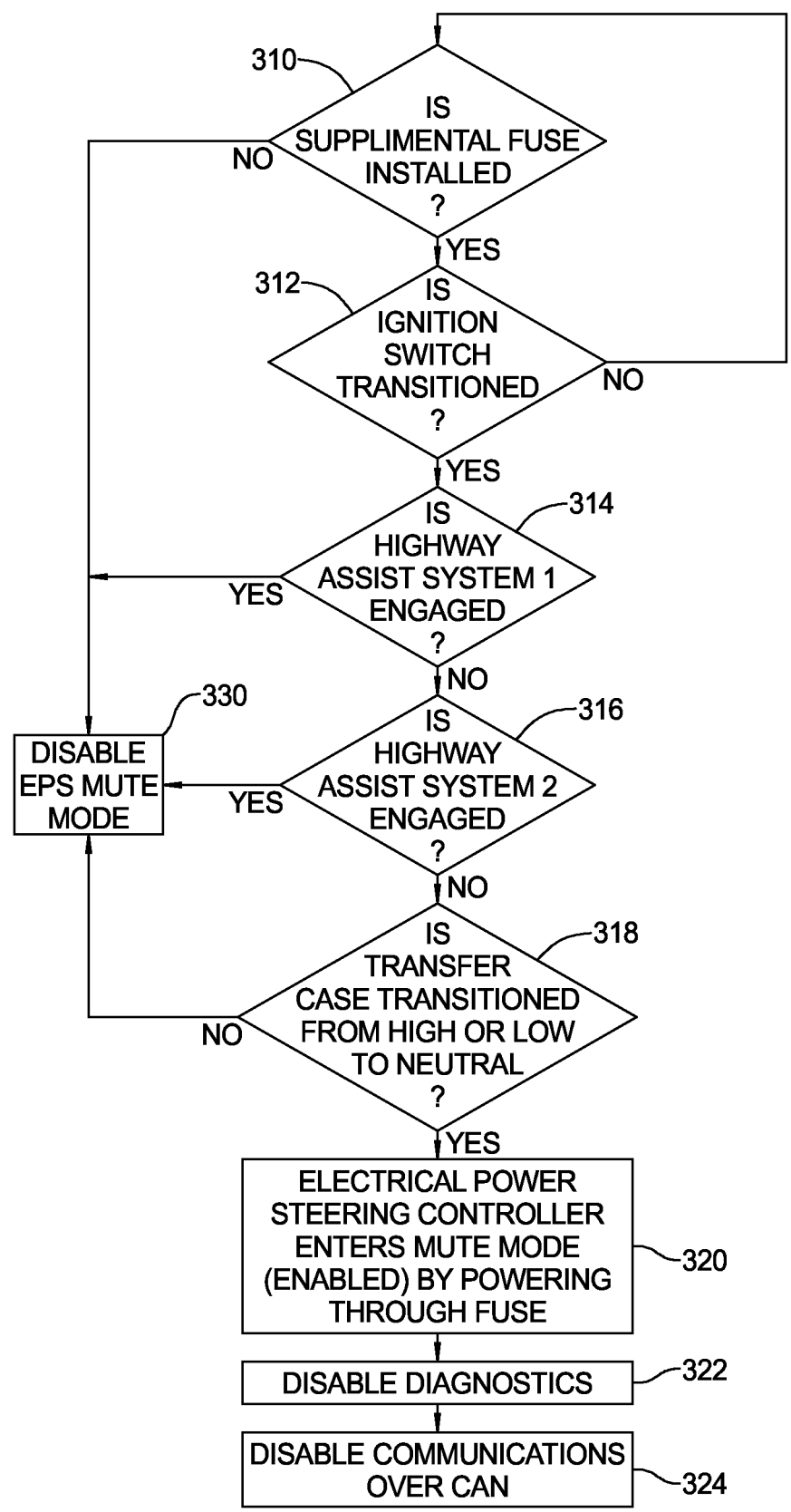
FIG. 3 is a flowchart of a method for operating mute mode of a vehicle.

Referring now to FIG. 3, a method for enabling and operating the towed mode of the power steering controller 40 is set forth. The steps herein are set forth by way of example and the order of execution is changeable. In step 310, it is determined whether a supplemental fuse has been installed within the vehicle. The supplemental fuse illustrated in FIG. 7 is placed within a predetermined location with the vehicle such as the fuse holder 72. When the supplemental fuse is installed, the power steering controller 40 is coupled to the battery 50 through the supplemental fuse 70 and the relay 60. Thus, the battery signal from the battery 50 powers the power steering controller rather than the vehicle power 54 illustrated in FIG. 2. When the supplemental fuse is installed in step 310, step 312 is performed. Step 312 determines whether the ignition switch 52 has been transitioned or positioned in a particular position. The ignition switch 52 is transitioned from an off state to a run state or on state. Likewise, the ignition switch 52 is also positioned from a run or on state to the off state.

The system will also not engage tow mode when a highway assist system is engaged. The highway assist system generates signals that are communicated within the vehicle such as the controller area network. When such signals are communicated, the highway assist system is engaged. In step 314, when the highway assist system is not engaged, step 316 determines whether a second assist system is engaged. The determination is performed in the same way as step 314 in that the communication signals from the highway assist system are determined. When such signals are not communicated, the highway assist system is not engaged. When the second highway assist system is not engaged in step 316, step 318 determines the position of the transfer case. When the transfer case is transitioned from a non-neutral position (high or low position) to neutral or is in positioned in neutral, step 320 is performed. In step 320, a mute mode of the electrical power steering controller enters a mute mode. As mentioned above, the mute mode allows the power steering controller 40 to be powered directly from the battery 50 rather than through the rest of the vehicle power 54 illustrated in FIG. 2.

In step 322, enabling the mute mode for the electrical power steering controller also disables the diagnostics from being communicated through the controller area network to the other components of the vehicle. That is, the power steering controller 40 does not attempt to communicate diagnostic signals through the controller area network in step 324. Likewise, signals are not being received by the power steering controller 40.

In operation, the power steering controller 40 continually determines whether to be in tow mode or driven mode. When other components, such as the components of highway system are communicating on the controller area network 34, the vehicle is being driven and therefore the power steering controller is placed or is in the driven mode. When the fuse 70 is installed and no highway assist system signals are present on the controller area network, the power steering controller 40 enters the mute mode to damp the dynamics of the towed vehicle.

Once in tow mode, the tow mode stays engage regardless of the ignition changing state. Referring back to steps 314-318, when one of the highway assist systems is engaged in steps 314 and 316, step 330 disables the electrical power steering system mute mode. Likewise, the position of the transfer case in this example, is continually monitored as well. In step 318, when the transfer case is in high or low (non-neutral) position or transitions from neutral to high or low, step 330 is also performed which disables the electrical power steering mute mode.

The foregoing description has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same is also be varied in many ways. Such variations are not to be regarded as a departure from the disclosure, and all such modifications are intended to be included within the scope of the disclosure.

What is claimed is:

1. A vehicle comprising a battery and wheels, said vehicle comprising:
   a supplemental fuse;
   a transfer case generating a transfer case status signal; and
   an electric power steering system coupled to the wheels and the battery through the supplemental fuse, said electrical power steering system comprising a tow mode and a driven mode, said electric power steering system entering the tow mode when the supplemental fuse communicates battery power to the electrical power steering system and the transfer case status signal corresponds to a neutral position.

2. The vehicle as recited on claim 1 further comprising an Ignition switch generating an ignition switch position signal, said electric power steering system entering the tow mode when the supplemental fuse communicates battery power to the electrical power steering system, the transfer case status signal corresponds to a neutral position and in response to the ignition switch position signal.

3. The vehicle as recited on claim 1 further comprising a safety system generating a safety system signal and wherein the electrical power steering system enters the driven mode from the tow mode in response to the safety system signal.

4. The vehicle as recited on claim 1 further comprising a safety system generating a safety system signal and wherein the electrical power steering system enters the driven mode from the tow mode in response to a lack of the safety system signal.

5. The vehicle as recited on claim 1 further comprising a safety system generating a safety system signal and wherein the electrical power steering system is prevented from entering the tow mode in response to the safety system signal.

6. The vehicle as recited on claim 1 further comprising entering the driven mode from the tow mode in response to a change of the transfer case status signal corresponding to a non-neutral position.

7. The vehicle as recited on claim 6 wherein the non-neutral position comprises a high position.

8. The vehicle as recited on claim 6 wherein the non-neutral position comprises a low position.

9. The vehicle as recited on claim 1 wherein the transfer case status signal corresponds to a transition from a first position to a second position.

10. The vehicle as recited on claim 1 wherein the tow mode comprises a damped operation mode.

11. The vehicle as recited on claim 1 further comprising a controller area network and wherein the electrical power steering system disables communications to the controller area network in the tow mode.

12. A method comprising:
   communicating power to an electrical power steering system through a supplemental fuse;
   communicating a neutral position signal to the electrical power steering system; and
   enabling a tow mode in the electrical power steering controller in response to both the neutral position signal and communicating power through the supplemental fuse.

13. The method as recited in claim 12 wherein enabling the tow mode comprises enabling the tow mode in the electrical power steering controller in response to the neutral position signal, communicating power through the supplemental fuse and a safety signal.

14. The method as recited in claim 12 further comprising, operating the electrical power steering system in a damped mode in response to enabling the tow mode.

15. The method as recited in claim 12 further comprising, operating the electrical power steering system in a mute mode in response to enabling the tow mode.

16. The method as recited in claim 12 further comprising, disabling a driven mode of an electrical power steering controller of the electrical power steering system in response to enabling the tow mode.

17. The method as recited in claim 12 further comprising disabling the tow mode in response to a transfer case signal corresponding to a high position or low position.

18. The method as recited in claim 12 further comprising disabling the tow mode in response to a safety system signal.

19. The method as recited in claim 12 wherein enabling the tow mode comprises enabling the tow mode in response to the neutral position signal, communicating power through the supplemental fuse and an ignition switch position signal.

* * * * *